United States Patent [19]
Ando et al.

[11] Patent Number: 5,177,490
[45] Date of Patent: Jan. 5, 1993

[54] GPS SATELLITE SIGNAL TRACKING SYSTEM FOR GPS RECEIVERS

[75] Inventors: Hitoshi Ando; Shozaburo Sakaguchi; Masaya Adachi; Hayato Yoshida; Junichi Shibata, all of Saitama, Japan

[73] Assignee: Pioneer Electronic Corporation, Tokyo, Japan

[21] Appl. No.: 624,443

[22] Filed: Dec. 10, 1990

[30] Foreign Application Priority Data

| Dec. 12, 1989 | [JP] | Japan | 1-320439 |
| Apr. 12, 1990 | [JP] | Japan | 2-95187 |
| Apr. 13, 1990 | [JP] | Japan | 2-96533 |

[51] Int. Cl.$^5$ .................. H04B 7/185; G01S 5/02
[52] U.S. Cl. ........................................ 342/357
[58] Field of Search ...................... 342/352, 356, 357

[56] References Cited

U.S. PATENT DOCUMENTS

| 4,426,712 | 1/1984 | Gorski-Popiel . | |
| 5,036,329 | 7/1991 | Ando | 342/357 |

FOREIGN PATENT DOCUMENTS

| 3716329 | 12/1988 | Fed. Rep. of Germany . |
| WO87/01540 | 3/1987 | PCT Int'l Appl. . |

OTHER PUBLICATIONS

Patent Abstracts of Japan, vol. 10, No. 188 (P-473) 2244) Jul. 3, 1986 & JP-A-61 034 486.
European Patent Office Search Report.

Primary Examiner—Theodore M. Blum
Attorney, Agent, or Firm—Sughrue, Mion, Zinn, Macpeak & Seas

[57] ABSTRACT

A satellite signal tracking system for a GPS receiver, wherein a GPS satellite is recaptured within a very short period of time, after the interruption of reception is cleared as by passing through a tunnel and the like, by widening a band width of the PLL search frequency gradually every after repeating the search for the satellite signal, performing a narrow-band search repeatedly as varying its center frequency along the Doppler shift curve, performing a narrow-band search for a specific period of time which is given by dividing the capture range of the PLL circuit by the Doppler shift rate and a wide-band search with use of an estimated satellite signal receiving frequency which is given by recalculating the Doppler frequency of the GPS satellite at the very moment according to the almanac data of the GPS satellite and is assigned as the center frequency, and, still further, performing the search for GPS satellites repeatedly with the estimated satellite signal receiving frequency in the center for recovering the function to perform the positional reckoning which is the primary function of the GPS receiver.

10 Claims, 11 Drawing Sheets

GPS SATELLITE SIGNAL TRACKING SYSTEM FOR GPS RECEIVERS

BACKGROUND OF THE INVENTION

1. Field of the Invention

The present invention relates to a satellite signal tracking system for Global Positioning System (GPS) receivers.

2. Description of the Prior Art

Positioning systems currently in service utilizing artificial satellites include a so-called Global Positioning System (GPS).

This positioning system, as the name implies, will cover the entire surface of the Globe by a total of 24 geodetic satellites when all of them are launched into six orbits at an altitude of approximately 20,200 km above the Earth, wherein four geodetic satellites are assigned for each orbit. Each geodetic satellite transmits a GPS signal containing navigational data for positioning to the Earth in a spread-spectrum system. The positioning is carried out with use of a GPS receiver arranged on the ground, on the sea as well as in the air by receiving GPS signals from a plurality of geodetic satellites, for example, by receiving GPS signals from three geodetic satellites for two-dimensional positioning and that from four geodetic satellites for three-dimensional positioning. In this way, based on the navigational data contained in the GPS signal from each geodetic satellite, position information of the receiving point such as a latitude, longitude and altitude at the time of reception can be reckoned on a real time base.

This GPS system was originally developed for U.S. military use, however a part of the GPS signal (C/A code) has been made available to the civil use. Therefore, it is possible to build navigation systems for motor vehicles, vessels, aircraft and the like by making use of the GPS signal.

A GPS receiver used for a vehicle-mounted navigation equipment starts a search operation to recapture the GPS satellite when the GPS satellite is screened from reception with a building and the like and the reception of the GPS signals is interrupted for more than a specified period of time (for example, one minute) in accordance with operational steps shown in a flowchart of FIG. 1.

The GPS satellites are transmitting GPS signals on a frequency of 1575.42 MHz, however, since they are not geostationary, the receiving frequency may shift due to the Doppler effect. The Doppler frequency shift caused by the orbiting GPS satellite is approximately $\pm 5$ KHz on the ground.

The Doppler effect may also be caused by the movement of the GPS receiver itself or, in case of a vehicle-mounted GPS receiver, by the movement of the vehicle. The Doppler frequency shift becomes the maximum of $\pm 600$ Hz when the vehicle moves at a speed of 60 m/sec. Further, a frequency shift of approximately $\pm 3$ KHz may occur at an oscillator of the GPS receiver. By adding these frequency shifts, the maximum frequency shift will become $5,000 \pm 600 \pm 3,000 = \pm 8,600$ Hz. This means that the satellite signal receiving frequency may shift to the maximum of $\pm 8,600$ Hz from the center frequency of 1575.42 MHz.

Accordingly, if an attempt is made to recover the lost GPS satellite by covering the maximum shift range of $\pm 8,600$ Hz. It is required for the GPS receiver to search for the satellite signal by swinging the search frequency widely within the maximum frequency shift range of $\pm 8,600$ Hz with the frequency of 1575.42 MHz in the center.

Generally, the GPS receiver adopts a phase-locked loop (PLL) circuit in its receiving circuit in order to synchronize the receiving frequency of the GPS receiver accurately with the transmitting frequency of the GPS satellite. There is no problem if a capture range of the PLL circuit is set widely enough to cover the maximum frequency shift range of $\pm 8,600$ Hz. However, in practice, due to structural limitations of the circuit configuration, the capture range of the PLL circuit is forced to be as narrow as $\pm 150$ Hz = 300 Hz or so.

Therefore, in order to capture the satellite signals by covering the maximum frequency shift range of $\pm 8,600$ Hz in the receiving frequency, it is necessary for the GPS receiver to divide the search frequency of the PLL circuit into multiple steps and perform the search by switching the steps as shown in FIG. 2. It is assumed, for example, that one PLL capture range is $\pm 150$ Hz = 300 Hz, a number of steps to be performed in searching will be $8,600/300 = 28.66 = 28$. That is, the search frequency should be switched as many as 28 steps for one side of the transmission frequency of the GPS satellite, and the total of 56 steps are required to cover the overall search range for upper and lower sides.

As mentioned previously, since the satellite signal is transmitted in accordance with the spread-spectrum system, the received signal should be despread firstly to identify whether or not the signal received is the one transmitted from the target GPS satellite. It takes about one second for this identification, accordingly, 56 steps of searching operation require at least 56 seconds and the essential reckoning for the position cannot be performed within this period of time.

Furthermore, the GPS receiver needs to capture and track at least three, desirably four, GPS satellites for positioning. The most preferable configuration of the GPS receiver is to allot one receiving channel for each GPS satellite. However, in a commercial instrument such as the vehicle-mounted navigational equipment described above, it is common to employ a single receiving channel in terms of requirements such that accuracy in positioning, low production cost, miniaturization and the like, and thereby the single receiving channel is multiplexed by time-division to enable the GPS receiver to receive satellite signals from three or four GPS satellites in sequence. In case of recapturing, for example, N satellites for tracking by using a sequential receiving type GPS receiver, at least $56 \times N$ seconds are necessary for making one round of the recapturing operation as shown in FIG. 2.

If the signal from the GPS satellite is happened to be interrupted by a building and the like while, for example, the vehicle was stopped at a stop signal and that the PLL search frequency was locked right on the receiving frequency of the GPS satellite, it may take another $56 \times N$ seconds for the PLL search frequency to lock on the receiving frequency of the GPS satellite in the next. Accordingly, there has been a problem with the prior art GPS receiver as it takes a considerable time for recapturing a GPS satellite, thus resulting in excessive delay before restarting the positioning.

It is therefore an object of this invention to eliminate the problem encountered in the prior art system and to provide a satellite signal tracking system for use in a GPS receiver enabling it to recapture a GPS satellite within the shortest possible time.

It is another object of this invention to provide a satellite signal tracking system for use in a GPS receiver allowing it to perform a wide band search repeatedly by predicting the receiving frequencies of the GPS satellite at least from the second search and thereafter for enabling it to recapture the GPS satellite within the shortest possible time.

SUMMARY OF THE INVENTION

In accordance with one aspect of this invention, the satellite signal tracking system for a GPS receiver includes a step of performing, in a GPS receiver being arranged to start recapturing of a GPS satellite when the reception of the satellite signal is interrupted for a predetermined period of time, a search for satellite signals by widening a PLL search frequency band as the search is repeated in order to recapture the GPS satellite with the lost satellite signal receiving frequency in the center for the PLL search frequency.

According to another aspect of this invention, in a GPS receiver being arranged to start recapturing of a GPS satellite when the reception of the satellite signal is interrupted for a predetermined period of time, the satellite signal tracking system for a GPS receiver includes a step of performing a narrow-band search for satellite signals by shifting the center frequency for the PLL search frequency band along a Doppler shift curve of the satellite signal receiving frequency in order to recapture the GPS satellite with the lost satellite signal receiving frequency at the starting point for the shifting.

According to still another aspect of this invention, in a GPS receiver being arranged to start wideband searching for satellite signals by varying a PLL search frequency across the whole width of the maximum shift range of the satellite signal receiving frequency when the reception of the satellite signal is interrupted for a predetermined period of time, the satellite signal tracking system for a GPS receiver includes steps of performing, firstly, a narrow-band search for satellite signals for a preset period of time, which is attained by divding a capture range of the PLL circuit by the Doppler shift rate of the receiving frequency being caused by the GPS satellite, by varying the search frequency within the range of the frequency shift based on the Doppler shift rate and the Doppler frequency shift caused by a moving speed of the GPS receiver with the lost receiving frequency in the center and, secondly, a wide-band search for satellite signals after the preset time has elapsed without recapturing any satellite signal by finding an estimated satellite signal receiving frequency through computing again the Doppler frequency of the GPS satellite at the time when the preset period of the time has elapsed based on orbital information (almanac data) stored in the GPS receiver and by switching the search mode with the estimated satellite signal receiving frequency in the center.

According to yet another aspect of this invention, in a GPS receiver being arranged to perform a wide-band search repeatedly by varying a PLL search frequency to cover a range of the maximum frequency shift of the satellite signal receiving frequency when the reception of the satellite signal is interrupted for a predetermined period of time, a satellite signal tracking system for a GPS receiver includes a step of performing a wide-band search for the second time and thereafter by estimating a satellite signal receiving frequency to start with for the wide band search based on the recalculation of the Doppler frequency of the GPS satellite at the commencement for each search and that of an offset frequency of a built-in clock of the GPS receiver with the estimated satellite signal receiving frequency in the center over a preset period of time.

In a vehicle-mounted GPS receiver, for example, the maximum shift range of the satellite signal receiving frequency is ±8,600 Hz or so and the rate of Doppler shift of the receiving frequency at that time is approximately 40 Hz/min at the maximum.

Therefore, the satellite signal receiving frequency being interrupted after the vehicle has entered into a tunnel and the like may vary, with the lapse of time, so as to apart gradually from the receiving frequency with the lapse of time in accordance with the aforesaid rate of Doppler shift.

For this reason, in case of recapturing the GPS satellite, there is more probability for a GPS receiver to recapture satellite signals by performing a search as increasing a search frequency band gradually with the repetition of searching or by performing a narrow-band search as remaining the search range within a narrow band while shifting the center frequency of the search frequency along the Doppler shift curve of the receiving frequency than by performing a search, as in the prior art GPS receiver as shown in FIG. 2, as swinging a search frequency widely from the beginning to the extent of the maximum shift range ±8,600 Hz of the satellite signal receiving frequency. Accordingly, in the first aspect of the present invention, since the search region of the PLL circuit for searching the satellite signal in increased gradually toward a wide band, the probability of finding the GPS satellite is increased and that the time required for recapturing the GPS satellite is greatly decreased.

In accordance with the second aspect of the invention, the center frequency of the PLL search frequency is varied along the Doppler shift curve of the satellite signal receiving frequency, so that the probability of finding the GPS satellite is also increased and that the time required for recapturing the GPS satellite is decreased.

Since the Doppler frequency shift to be caused by the movement of the GPS satellite is ±5 KHz at the maximum and the Doppler shift rate is around 40 Hz/min at the maximum, if the capture range of the PLL circuit is assumed to be, for example, 300 Hz=±150 Hz, it takes 150/40=3 minutes 45 seconds or so for the satellite signal receiving frequency to deviate from the capture range by the Doppler shift.

Conversely speaking, the Doppler frequency shift to be caused by the GPS satellite remains, until the time of 3 min 45 seconds elapses, within the capture range ±150 Hz of the PLL circuit with the lost receiving frequency in the center. As for the cause of the shift of the satellite signal receiving frequency, there are the Doppler frequency shift caused by the movement of the GPS receiver itself and the frequency shift of an oscillator installed in the GPS receiver besides the caused by the movement of the GPS satellite, however, such frequency shifts are occurs very slowly within a long period of time and, therefore, they are negligible within such a short period of time as several minutes.

Therefore, it is quite possible that the maximum shift range of the satellite signal receiving frequency within the period of 3 minutes 45 seconds remains within a range of ±750 which is the sum of the capture range ±150 Hz of the PLL circuit and the Doppler shift ±600 Hz caused by the movement of the GPS receiver.

The present is based on this concept and arranged to perform, when a satellite signal becomes unreadable, firstly, a narrow-band search for the satellite signal for a preset period of time computed by dividing the capture range of the PLL circuit by the Doppler shift rate of the satellite signal receiving frequency by varying the search frequency within the maximum frequency shift range estimated by the capture range of the PLL circuit and a speed of the movement of the GPS receiver with the lost receiving frequency in the center.

When no satellite signal is recaptured within the preset period of time, an estimated satellite signal receiving frequency is found by computing again the Doppler frequency of the GPS satellite at the time when the preset period of the time has elapsed based on the almanac data stored in the GPS receiver, and performing a wide-band search for satellite signals by varying the PLL search frequency across the entire width of the maximum shift range of the satellite signal receiving frequency with the estimated receiving frequency in the center. As the consequence of the foregoing, the time required for recapturing the satellite signal is shortened whether in the narrow-band search or in the wide-band search.

Regarding the first time wide-band search for capturing a GPS satellite by the GPS receiver, if it is a search for capturing a GPS satellite for the first time under such condition as no GPS satellite has been captured, so-called "the initial capturing", the search is started with a satellite signal receiving frequency which is computed from the almanac data stored in the GPS receiver as assigning it as the center frequency, while if it is a search for recapturing the lost GPS satellite again under such condition as the contact with the GPS satellite has lost, so-called "the recapturing", the search is started with the satellite signal receiving frequency which was in use when the contact has lost as assigning it as the center frequency.

As described above, the frequency of the receiving satellite signal may shift to the maximum extent of ±5 KHz due to the Doppler shift caused by the movement of the GPS satellite, and in addition to this, the built-in clock of the GPS receiver may drift within the maximum range of ±3 KHz or ten steps (3000/300=10) if it is expressed by search steps of the PLL circuit.

Therefore, in both cases of the initial capturing and in recapturing, if the desired GPS satellite could not be captured in the first wide-band search, it is highly probable in the following second wide-band search and thereafter that the satellite signal receiving frequency may be deviated greatly from the center frequency which has been used in the first wide-band search. Hence, it is preferable to perform the wide-band search with the frequency which is considered to be closest to the satellite signal receiving frequency at the time of starting each search as assigning it the center frequency to start with, rather than performing the search indiscriminately.

Accordingly, the present invention is grounded on the concept as described above, and thereby if a GPS satellite could not be captured through a first wide band search, the Doppler frequency of the GPS satellite and the offset frequency of the built-in clock of the GPS receiver are recalculated prior to perform the wide-band search for the second time and thereafter for estimating a satellite signal receiving frequency at the time of starting the succeeding wide-band search based on the Doppler frequency and the offset frequency, and then the satellite signal is searched by sweeping the PLL search frequency to cover a wide-band with the estimated satellite signal receiving frequency in the center.

With this configuration, the wide-band search can be performed with the frequency being predicted to be closest to the satellite signal receiving frequency at that time in the center, thus increasing the probability for capturing the GPS satellite considerably.

The Doppler frequency of the GPS satellite for predicting the aforesaid receiving frequency can be obtained by calculating the almanac data or ephemeris data received at that point of time.

Further, the offset frequency of the built-in clock of the GPS receiver can be obtained in the process of reckoning the current position of the GPS receiver.

The GPS receiver can be started for positioning at the time when at least three needed satellites are in contact and a position dilution of precision (PDOP) is less than a fixed value. Normally, in the GPS receiver, a satellite signal from an extra GPS satellite is received simultaneously in a sequential manner together with that of the needed GPS satellites for positioning in order to backup any one of the GPS satellites in the event of an emergency, and if one of the satellite signals from the GPS satellites in use for positioning became unreadable, the GPS receiver can switch the reception to the satellite signal from the backup GPS satellite to continue the positioning. Therefore, even if any satellite signal becomes unreadable, the GPS receiver can find the offset frequency of the built-in clock by computation, unless the number of the captured satellites becomes less than three which is necessary for positioning.

PREFERRED EMBODIMENTS OF THE INVENTION

Preferred embodiments of this invention will now be described by referring to the accompanying drawings.

Figure 1:
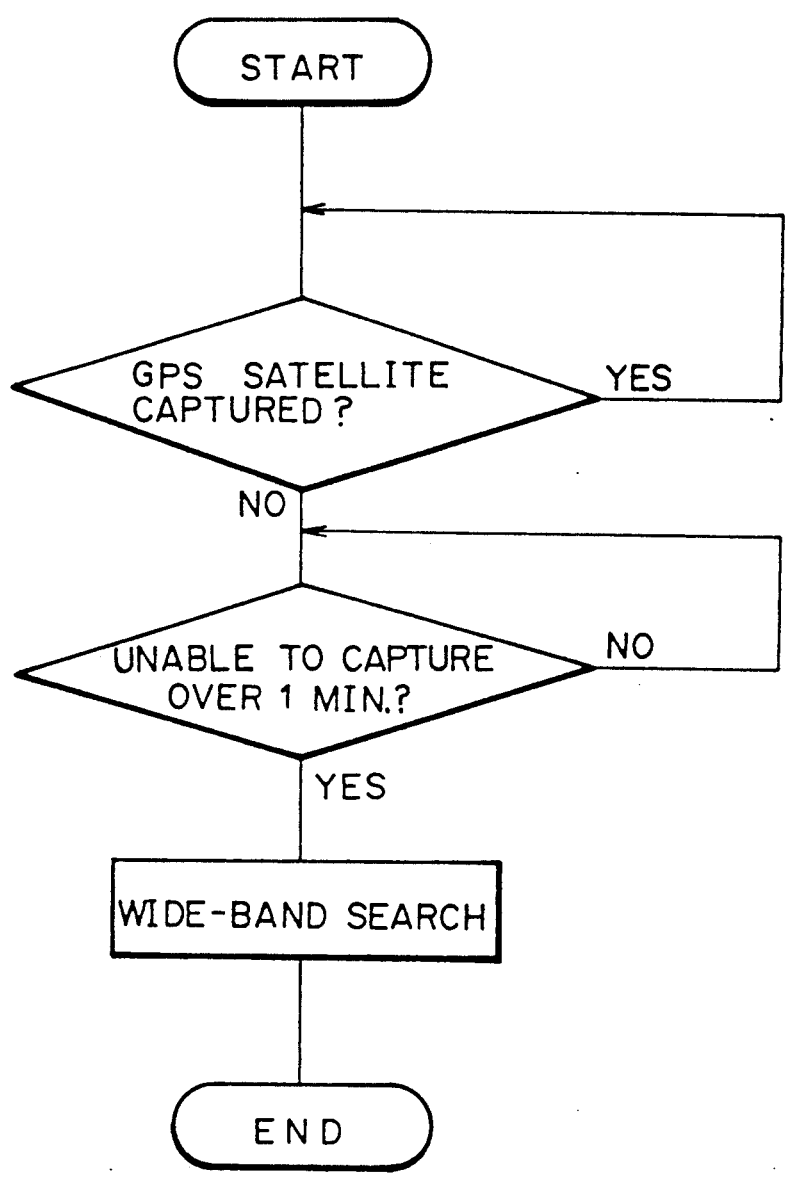
FIG. 1 is a flowchart showing operational steps as performed in a conventional method.
Figure 2:
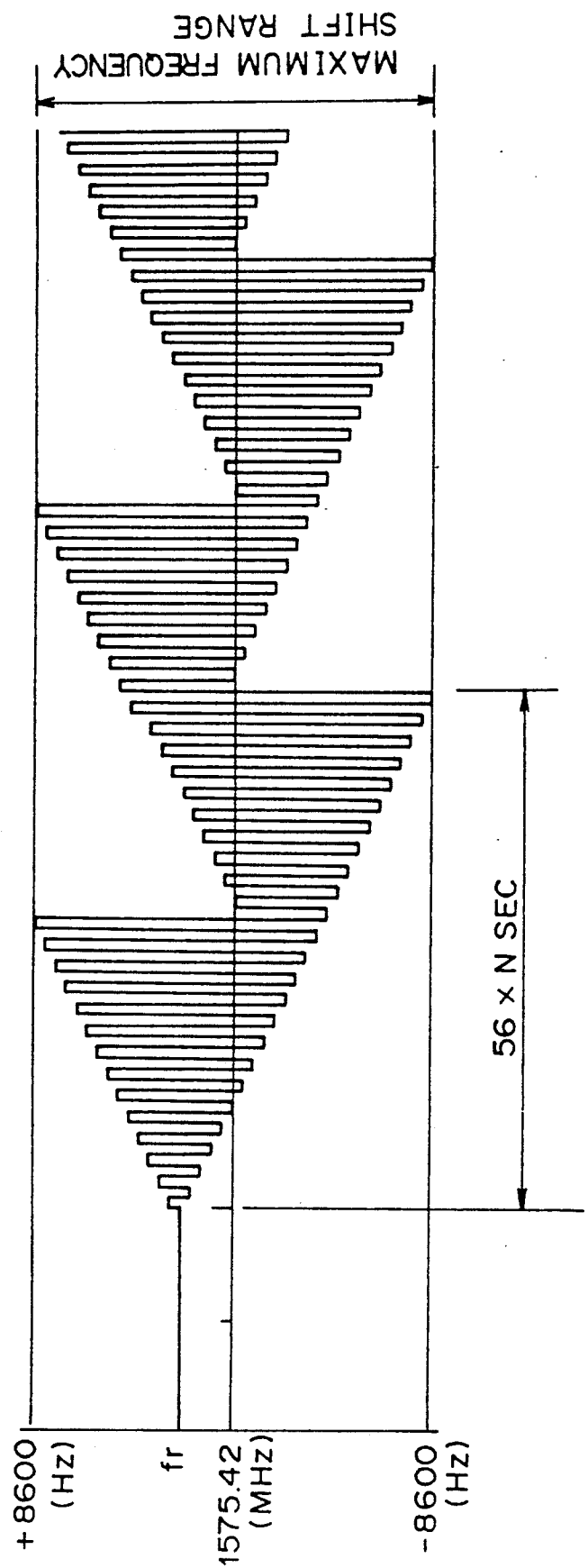
FIG. 2 is a diagram showing a conventional method of switching a search frequency.
Figure 3:
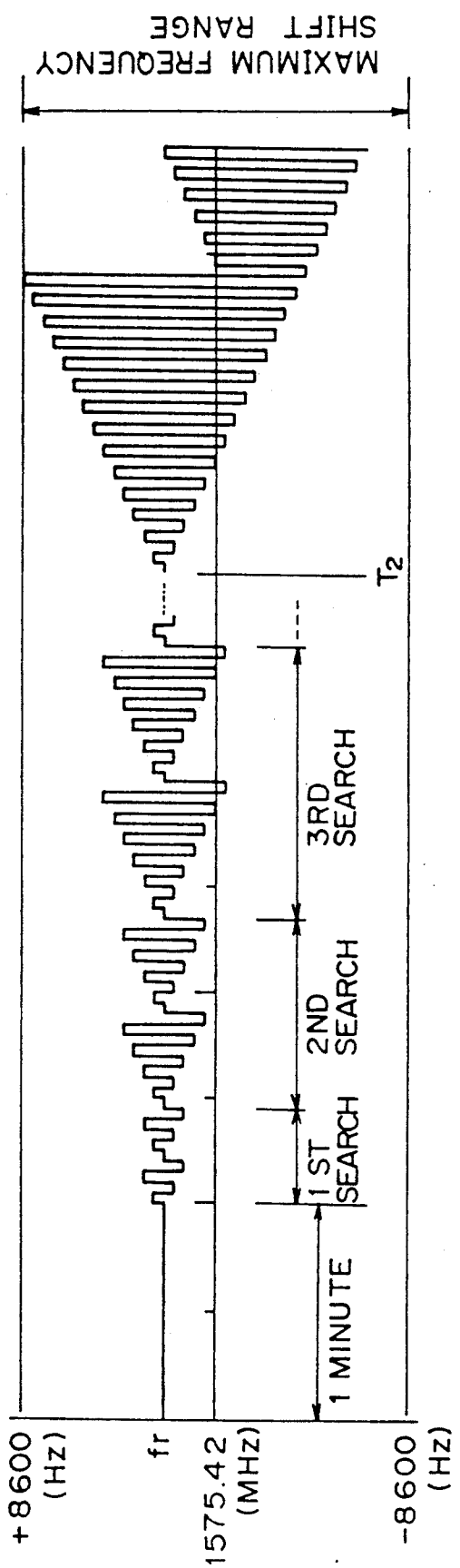
FIG. 3 is a diagram showing a method of switching a search frequency embodying the present invention.
Figure 4:
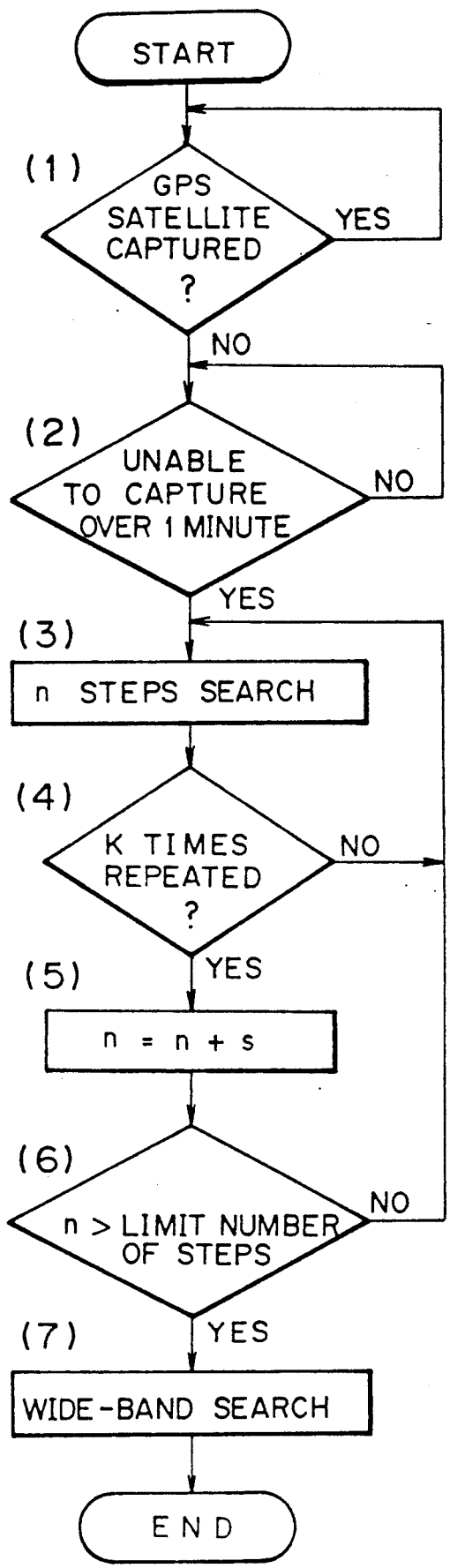
FIG. 4 is a flowchart showing operational steps as performed in the embodiment of FIG. 3.

FIG. 3 is a diagram showing a method of switching a search frequency embodying the present invention and FIG. 4 is a flowchart showing operational steps to be performed by the embodiment of FIG. 3. It is assumed that a GPS receiver is in a state of receiving a satellite signal on a receiving frequency fr.

If a vehicle carrying the GPS receiver enters behind a building while receiving a satellite signal from a desired GPS satellite on the receiving frequency fr and the satellite signal becomes unreadable (step [1] of FIG. 4) for a predetermined period of time, for example, one minute (step [2]), the GPS receiver starts the operation for recapturing the GPS satellite at the point of time T1 when the one minute has elapsed after losing the contact.

That is, IF it is assumed that a PLL capture range of the GPS receiver is ±150 Hz=300 Hz and the maximum shift range of the satellite signal receiving frequency is ±8,600 Hz, it is necessary for the GPS receiver to perform ±28 steps, or 56 steps in sum of upper and lower sides, for switching the search frequencies in order to search the entire band width of the maximum frequency shift range of ±8,600 Hz of the satellite signal receiving frequency.

However, according to the present invention, in the first embodiment thereof, firstly, a number of search steps "n" for a preset initial value is set to, for example, n=±2 steps (step [3]), and then, as shown in FIG. 3, the search for the satellite signal is repeated for a preset number of times k, for example, k=2 times (step [4]) while switching the PLL search frequencies to cover the range of n=±2 steps with the receiving frequency fr at the time of interruption in the center.

If the GPS receiver fails to receive the satellite signal during this first search, it is determined that there is no satellite signal receiving frequency within the range of ±2 steps, and the number of search steps "n" is increased by a predetermined number of increasing steps S, for example, S=±2 steps, and in turn changed to n=4 steps (step [5]).

After deciding whether or not the number of search steps "n" exceeds a preset limit number (step [6]), the search operation is transferred to a second search operation (step [3]) and thereby the search is repeated for k=2 times (step [4]) while switching the PLL search frequencies to cover the range of n=±4 steps.

As described above, the number of search steps is increased by the predetermined number of increasing steps S, whenever the GPS receiver fails to recapture a GPS satellite, until the number of steps reaches the preset limit number of steps by repeating the search for the satellite signal (step [6]).

Since the satellite signal receiving frequency changes its value gradually at a specific Doppler shift rate as described above, the possiblity for the GPS satellite to be recaptured at any point of timing during the above described search operations is very high. Therefore, in the embodiment of FIG. 3, it is not necessary to sweep the entire band width of the maximum frequency shift range of ±8,600 Hz with search steps by switching the search frequencies from the beginning, and it is possible to recapture the GPS satellite within a short period of time.

When the GPS satellite has not been recaptured even if the search steps are increased to the preset limit number of steps (step [6]), the search mode may be returned to the conventional wide-band search mode after passing the point of time T2 of FIG. 3 (step [7]), wherein the search operation is performed by switching search frequencies with ±28 steps, totally 56 steps on both upper and lower sides, to cover the entire band width of the maximum frequency shift range ±8,600 Hz of the satellite signal receiving frequency.

Figure 5:
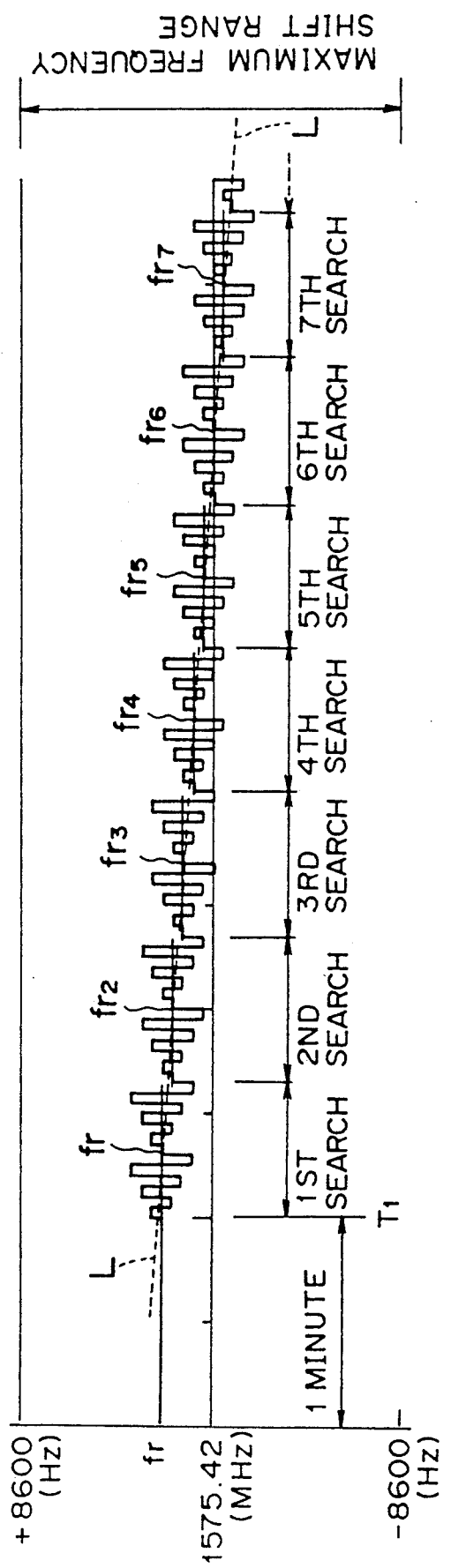
FIG. 5 is a diagram showing another method of switching a search frequency embodying the present invention.
Figure 6:
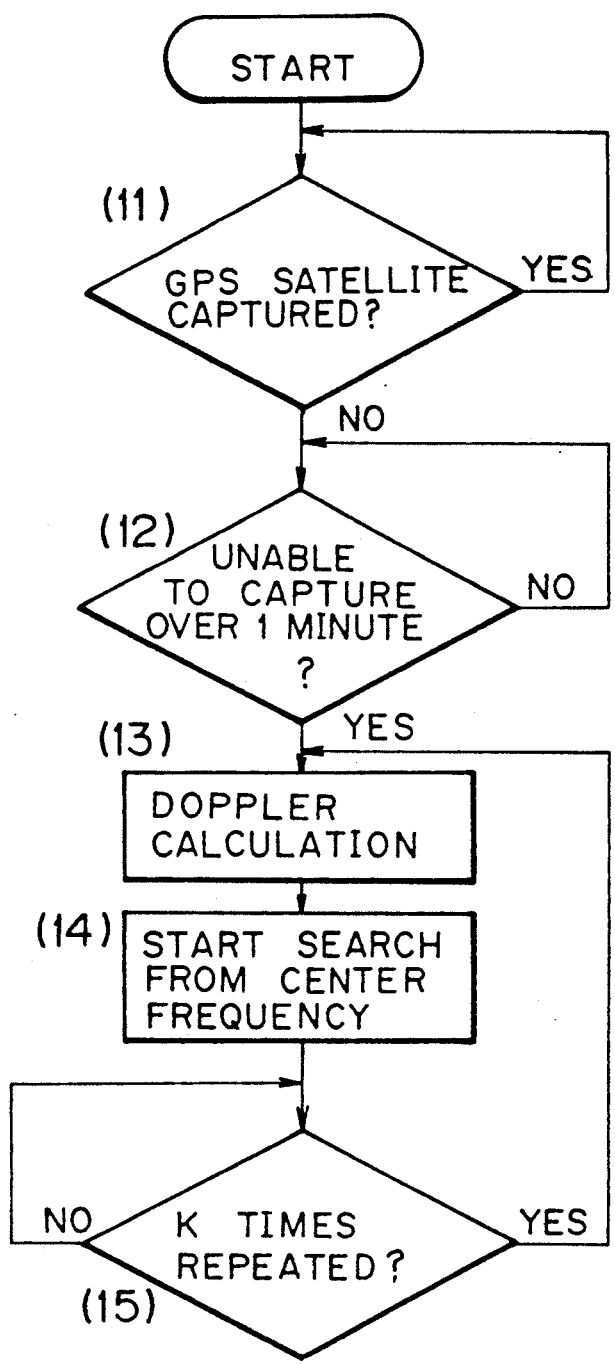
FIG. 6 is a flowchart showing operational steps as performed in the embodiment of FIG. 5.

Now referring to FIGS. 5 and 6, whereby FIG. 5 is a diagram showing another method of switching a search frequency embodying the present invention and FIG. 6 is a flowchart showing opreational steps as performed in the embodiment of FIG. 5.

Figure 7:
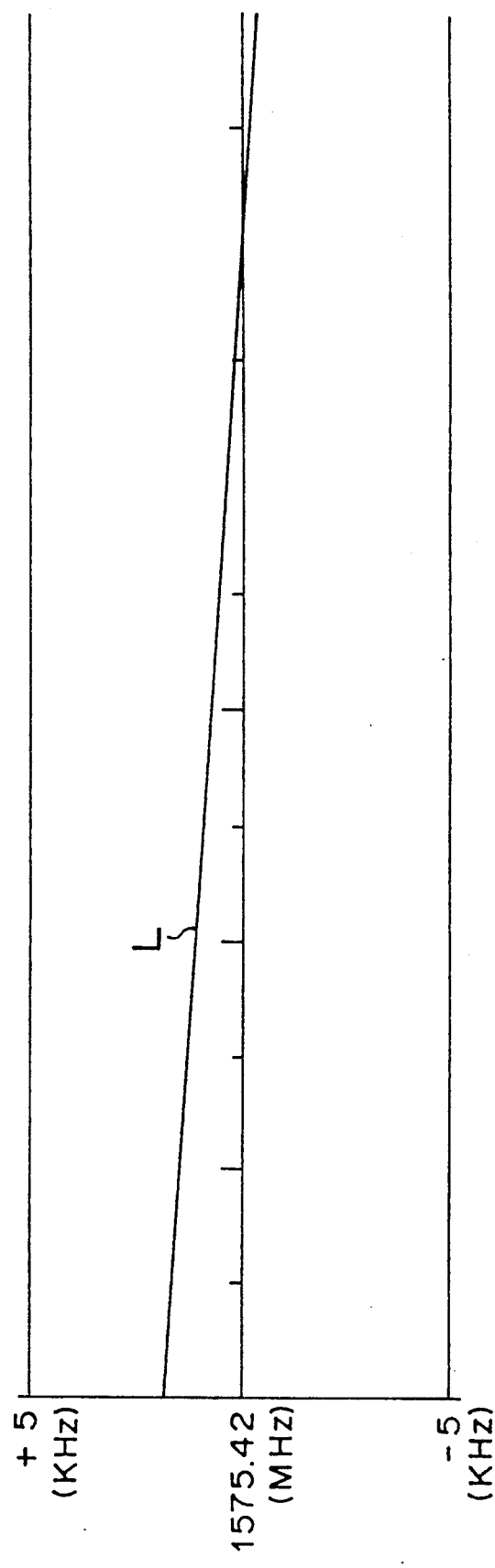
FIG. 7 is a diagram showing a Doppler shift curve of a satellite signal receiving frequency.

As described above, the satellite signal receiving frequency fr varies with the lapse of time, for example, as shown in FIG. 7, according to a specific rate of the Doppler shift. In the embodiment of FIG. 5, a narrow band search for the satellite signal is performed by varying the center frequency of the PLL search frequency along the Doppler shift curve L of FIG. 7.

Assuming now that the vehicle, while receiving a satellite signal from a specific GPS satellite at the receiving frequency fr, enters into a shade of a building, for example, to interrupt the reception of receive the satellite signal (step [11] of FIG. 6) and the state of this interruption lasts for a predetermined period of time, for example, one minute (step [12]), the GPS receiver starts the search operation for recapturing the GPS satellite according to the present invention at the point of time T1 where the one minute has elasped.

In the search operation, the Doppler shift frequency at the point of time at which the search has started is calculated at first (step [13]).

In the first search operation, the satellite signal receiving frequency fr at the point of time at where the satellite signal reception became unreadable is assigned as the Doppler shift frequency and, as shown in FIG. 5, the search operation for the satellite signal is repeated for the preset number of times K, for example, k=2 times, by swinging the PLL search frequencies across the range of preset steps, for example, ±3 steps, with the assigned Doppler shift frequency fr in the center (steps [14]) and [15].

When the GPS satellite has not been recaptured during the first search operation, the program returns to step [13], and thereby the Doppler shift frequency fr2 for the second search operation along the Doppler shift curve L is calculated. Hence, the second search operation for the satellite signal is repeated two times by swinging the PLL search frequencies across of the range of ±3 steps, with the calculated Doppler shift frequency fr2 in the center (steps [14] and [15]).

Whenever the recapturing of the GPS satellite fails, new Doppler shift frequencies fr3, fr4, fr5, fr6, fr7 . . . , which vary along the Doppler shift curve L of FIG. 7, are computed in succession, and the search for the satellite signal is repeatedly carried out by swinging the PLL search frequencies across the range of ±3 steps with each of the above computed Doppler shift frequency in the center respectively.

Since hte satellite signal receiving frequency gradually changes its value at a specific Doppler shift rate as described above, there is a high possibility of recapturing the GPS satellite at any point of timing during the above described search operations. Therefore, in the embodiments of FIG. 5, it is not necessary to swing the search frequencies through switching steps across the entire band of the maximum shift range of ±8,600 ft Hz, and thus it is possible to recapture the GPS satellite in a short time while keeping the search within a narrow band.

As it is apparent from the above described embodiments of this invention that it is possible for a GPS receiver, after a vehicle passing through a place at where the reception of the satellite signal is interrupted, such as in a tunnel, to recapture the GPS satellite in a short time for recovering the function to perform the positioning which is the primary function of the GPS receiver.

Figure 8:
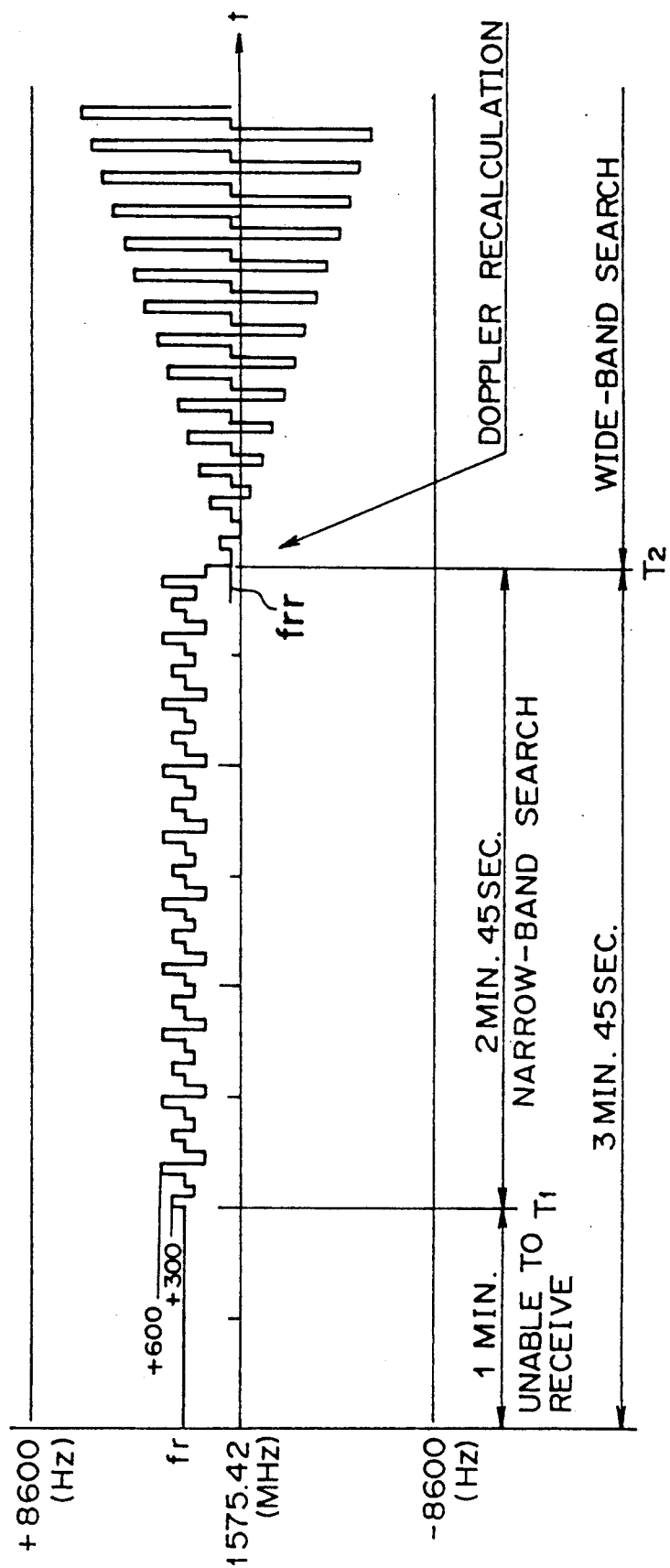
FIG. 8 is a diagram showing still another method of switching a search frequency embodying the present invention.
Figure 9:
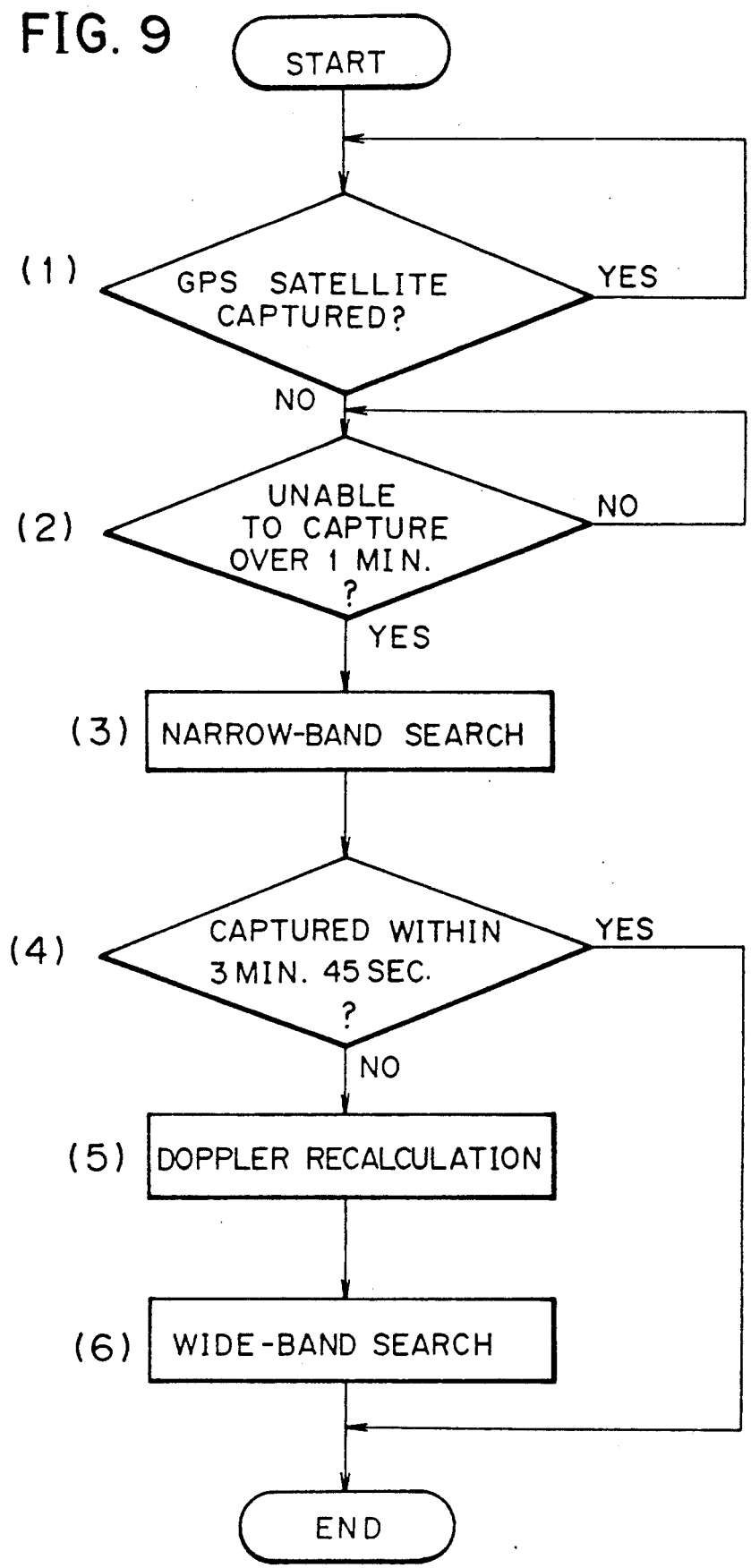
FIG. 9 is a flowchart showing operational steps as performed in the embodiment of FIG. 8.

Now referring to FIGS. 8 and 9, FIG. 8 shows still another embodiment of the invention and FIG. 9 is a flowchart showing operational steps therefor. It is assumed that the GPS receiver is now receiving a satellite signal on a satellite signal receiving frequency fr in FIG. 8.

Again it is assumed that the vehicle, while receiving a satellite signal from a specific GPS satellite on the receiving frequency fr, enters a shade of a building, for example, to thereby interrupt the reception of the satellite signal (step [1] of FIG. 9) and the state of the interruption lasts for a predetermined period of time, for example, one minute (step [2]), the GPS receiver starts the operation for recapturing the GPS satellite in accordance with a narrow band search, which a feature of this invention, at the point of time T1 where the one minute has elapsed from the interruption.

If the PLL capture range of the GPS receiver is ±150 Hz=300 Hz and the rate of the Doppler shift of the satellite signal receiving frequency is 40 Hz/min, the center of the PLL search frequency is switched in two steps of ±300 Hz and ±600 Hz by centering the receiving frequency fr at which the interruption of reception has occurred, as shown in FIG. 8, for the period of 2 minutes 45 seconds from the time T1 to time T2, whereby the search for the satellite signal is performed within the range of ±750 Hz about the receiving frequency fr being centered. Since the search range is narrow, it is possible to recapture the GPS satellite within a shortest possible time.

When the GPS satellite is recaptured successfully before 3 minutes 45 seconds elapses, it is not necessary to perform a wide band search to follow and, hence, the operation for recapturing the GPS satellite is terminated (Yes in step [4]).

On the other hand, if the GPS satellite could not be recaptured within the period of 3 minutes and 45 seconds, the program proceeds to step [5] (No in step [4]), that is, the Doppler frequency of the GPS satellite at the time when the above period has elasped is recalculated with use of orbital information of the GPS satelite being stored in the GPS receiver. On the basis of this recalculation, an estimated satellite signal receiving frequency frr after the 3 minutes 45 seconds has elapsed is obtained (step [5]). The GPS receiver is then switch from the narrow-band search mode to a wide-band search mode after passing this 3 minutes 45 seconds, and thereafter, the wider-band search for the satellite signal is performed by switching the PLL search frequency in sequence across the entire width of the maximum shift range of ±8,600 Hz with centering the estimated satellite signal receiving frequency frr (step [6]). Thus, after the 3 minutes 45 seconds have elapsed, the wide-band search is performed by the GPS receiver with the center frequency predicted as to be the most close to the satellite signal receiving frequency at that point of time. Therefore, it is possible to recapture the GPS satellite in a short time.

According to the above described another embodiment of this invention, it is possible for the GPS receiver that, when the satellite signal which has been in reception becomes unreadable for more than a predetermined period of time, firstly a narrow-band search is performed for a specific period of time and secondly a wide-band search is performed. Therefore, the GPS satellite can be recaptured whether by the narrow-band search or by the wide-band search in a short time and the GPS receiver can recover its primary function of positioning in such a short period of time.

Figure 10:
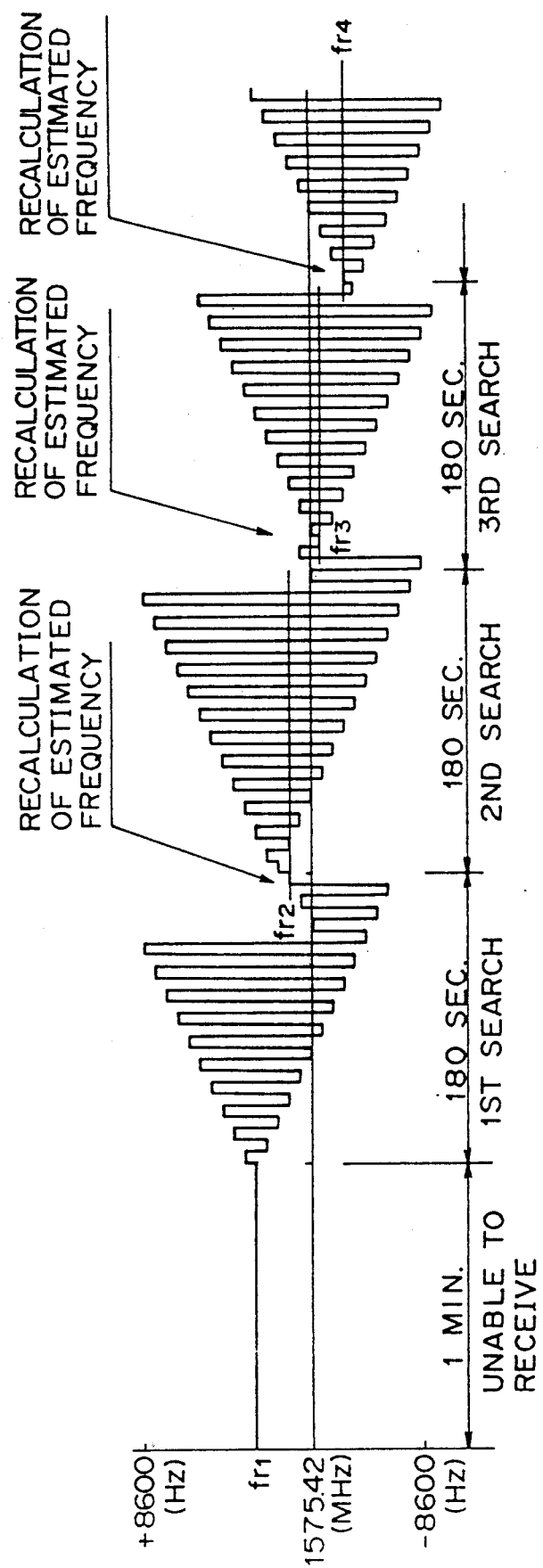
FIG. 10 is a diagram showing yet another method of switching a search frequency embodying the present invention.
Figure 11:
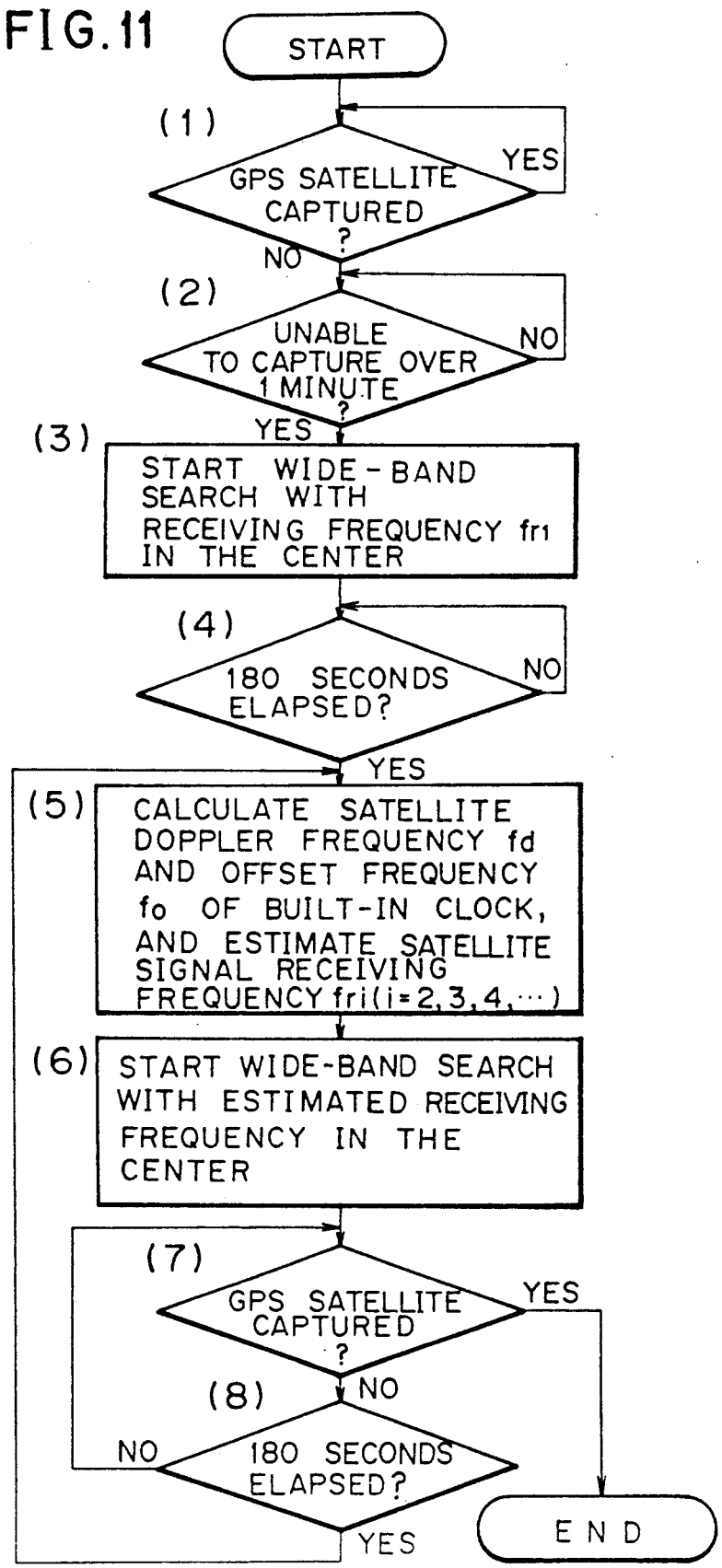
FIG. 11 is a flowchart showing operational steps as performed in the embodiment of FIG. 10.

Referring to FIG. 10, there is shown still another embodiment of this invention in a block form. FIG. 11 is a flowchart showing operational steps to be performed by the embodiment of FIG. 10. Now, it is assumed that the GPS receiver is receiving the satellite signal on a receiving frequency fr1 in FIG. 10.

If the vehicle, for example, enters behind a building and the like while receiving a specific satellite signal on the above mentioned receiving frequency fr1 and the reception of the satellite signal is interrupted (step [1] in FIG. 11) and if the state of this interruption lasts for a predetermined period of time, for example, one minute (step [2]), the GPS receiver starts a wide-band search for the first time (step [3]) and performs an operation for recapturing the GPS satellite for a predetermined period of time, for example, 180 seconds (step [3]). During this first wide-band search, the search operation is performed with the satellite signal receiving frequency fr1 at which interruption has occurred in the center.

If the desired GPS satellite has not been recaptured through the first wide-band search even when the predetermined period of time (180 seconds) has elapsed (step [4]), a second wide-band search will start in the next.

Prior to the start of the second wide-band search, a Doppler frequency fd of the GPS satellite is calculated according to the orbital information such as almanac data or ephermeris data being received and stored in the GPS receiver and, also, an offset frequency fo of the built-in clock of the GPS receiver is calculated through positional reckoning. Thereupon, an estimated satellite signal receiving frequency is found by fr2=fd+fo at the time of starting the second wide-band search (step [5].

After finding the estimated satellite signal receiving frequency fr2, the second wide-band search is started with the estimated satellite signal receiving frequency fr2 in the center (step [6]) and the operation for recapturing the GPS satellite is performed for the predetermined period of time (180 seconds) (step [7] and [8]). When the satellite is recaptured within the predetermined period of time, the operational steps will end.

If no GPS satellite has been recaptured even if the predetermined period of time has elapsed, the program is returned to step [5], and thereby another estimated satellite signal receiving frequency fr3 for the third wide-band search is recalculated, hence a wideband search for the GPS satellite is performed again with the recalculated receiving frequency fr3 in the center, in the same manner as in the first wide-band search (steps [5] through [8]).

Thereafter, similarly to the above, by finding the estimated satellite signal receiving frequency fri (i=2, 3, 4, ... ) every time after failing to recapture the GPS satellite in the preceding wide-band search, successive wide-band searches are repeatedly performed until the GPS satellite is recaptured. Since, searches for the satellite signal are repeated with the frequencies predicted to be the closest to the receiving frequency in the center, the probability of recapturing the GPS satellite is increased, thus resulting in expeditious recapturing of the GPS satellite.

In the embodiment of FIG. 10, a duration of 180 seconds is adopted as the predetermined period of time for allowing the repetition of wide-band searches, however, this is only because that three GPS satellites are selected for the GPS receiver to perform positioning and thereby 180 seconds is given by 3×56=168 seconds which is required for receiving satellite signals from three GPS saellites in sequence and this resultant is nearly equal to 180 seconds. Accordingly, the predetermined period of time for providing repetitive wide-band searches is not limited to 180 seconds but to the most suitable length of time correspondingly with a number of GPS satellites, a number of receiving channels, a method of combining the sequential receptions, etc.

In the embodiment of FIG. 10, the recapturing of the GPS satellite has been described, however, in case of an initial capturing of a GPS satellite, it is the only difference that the first wide-band search is performed by utilizing a satellite signal receiving frequency obtained by calculating the almanac data of the GPS satellite and the rest of the operational steps are the same as those of recapturing the GPS satellite described above.

According to the present invention, it is possible for a GPS receiver, after a vehicle passing through a place at where the reception of the satellite signal is interrupted, such as in a tunnel, to recapture the GPS satellite in a short time by widening a band width of the PLL search frequency gradually every after repeating the search for the satellite signal or by performing a narrow-band search repeatedly as varying its center frequency along the Doppler shift curve for recovering the function to perform the positional reckoning which is the primary function of the GPS receiver.

Further, according to the present invention, it is possible for the GPS receiver that, when the sattellite signal which has been in reception becomes unreadable for more than a predetermined period of time, firstly a narrow-band search is performed for a specific period of time which is given by dividing the capture range of the PLL circuit by the Doppler shift rate and, secondly, when the satellite signal has not been received through the narrow-band search, a wide-band search is performed with use of an estimated satellite signal receiving frequency which is given by recalculating the Doppler frequency of the GPS satellite at the very moment according to the almanac data of the GPS satellite and is assigned as the center frequency. Therefore, the satellite signal can be recaptured whether by the narrow-band search or by the wide-band search in a short time and the GPS receiver can recover its primary function of positioning in such a short period of time.

Still further, according to the GPS satellite tracking system of the present invention, the search for GPS satellites is repeatedly performed with the estimated satellite signal receiving frequency in the center such that, in case of recapturing GPS satellites, the estimated satellite signal receiving frequency is used from the second search and that, in case of initial capturing of GPS satellites, the estimated satellite signal receiving frequency is used from the beginning. Therefore, the capturing of the GPS satellite can be performed quickly.

Although the present invention has been described in detail with reference to the presently-preferred embodiments, it should be understood by those of ordinary skilled in the art that various modifications can be made without departing from the spirit and scope of the invention. Accordingly, the invention is not to be limited except as by the appended claims.

What is claimed is:

1. For use with a GPS receiver arranged to start a search for recapturing a GPS satellite signal when reception of said satellite signal is lost for a predetermined period of time, a GPS satellite signal tracking system for a GPS receiver including the steps of:
   starting a search for a satellite signal with the lost satellite signal receiving frequency in the center of a PLL search frequency; and
   gradually and successively widening a band width of the PLL search frequency after each search and repeating the search for the satellite signal until said satellite signal is recaptured.

2. A GPS satellite signal tracking system for a GPS receiver according to claim 1, wherein said widening is performed by increasing a predetermined number of search steps.

3. A GPS satellite signal tracking system for a GPS receiver according to claim 2, wherein said increasing is performed until the total number of search steps reaches a predetermined limit number of search steps.

4. For use with a GPS receiver arranged to start a search for recapturing a GPS satellite signal when reception of said satellite signal is lost for a predetermined period of time, a GPS satellite signal tracking system for a GPS receiver including the steps of:
   starting a narrow-band search for a satellite signal with the lost satellite signal receiving frequency in the center of a PLL search frequency; and
   successively varying the center frequency of the PLL search frequency along a Doppler shift curve of the satellite signal receiving frequency and repeating said narrow-band search at the thus varied center frequency until said satellite signal is recaptured.

5. A GPS satellite signal tracking system for a GPS receiver according to claim 4, wherein said narrow-band is performed by swinging the PLL search frequency within a predetermined number of search steps.

6. For use with GPS receiver arranged to start a wide-band search for recapturing a satellite signal by varying of PLL search frequency widely across the entire width of the maximum variable range of a satellite signal receiving frequency when reception of a satellite signal is lost for a predetermined period of time, a GPS satellite signal tracking system for a GPS receiver including the steps of:
   initially conducting a narrow-band search for a satellite signal with the lost satellite signal receiving frequency in the center of said narrow-band search for a period of time given by dividing a PLL capture range by a Doppler shift rate of the satellite signal receiving frequency being caused by the movement of the GPS satellite within such a frequency shift range as defined by the Doppler shift rate and a Doppler shift being caused by a traveling speed of the GPS receiver; and thereafter
   starting a wide-band search for the satellite signal with an estimated satellite signal receiving frequency in the center after failing to recapture the satellite signal within said period of time, said estimated satellite signal receiving frequency being determined by recalculating the Doppler frequency of the GPS satellite at the time when said period of time has elasped from orbital information of the GPS satellite stored in the GPS receiver.

7. A GPS satellite signal tracking system for a GPS receiver according to claim 6, wherein said narrow-band search is performed by switching the center frequency of the PLL search frequency.

8. A GPS satellite signal tracking system for a GPS receiver according to claim 6, wherein said wide-band search is performed by switching the PLL search frequency across the entire band width of the maximum frequency shift range of rhe satellite signal receiving frequency.

9. For use with a GPS receiver arranged to start a wide-band search repeatedly for recapturing a GPS satellite by varying a PLL search frequency widely across the entire width of the maximum frequency shift range of a satellite signal receiving frequency, a GPS satellite signal tracking system for a GPS receiver including the steps of:

estimating a satellite signal receiving frequency at the time of commencing a wide-band search at least from the second time and thereafter by recalculating a Doppler frequency of the GPS satellite and an offset frequency of a built-in clock of the GPS receiver at the point of time at which the wide-band search is started; and performing the wide-band search with the estimated satellite signal receiving frequency in the center for a predetermined period of time.

10. A GPS satellite signal tracking system for a GPS receiver according to claim 1, wherein said Doppler frequency is derived from orbital information stored in the GPS receiver and said offset frequency of the built-in clock of the GPS receiver is derived from reckoning.

* * * * *